Nov. 21, 1950 D. L. BLANEY 2,530,564
EDITING AND INSPECTION OF INVISIBLE SOUND TRACKS
Filed June 30, 1948
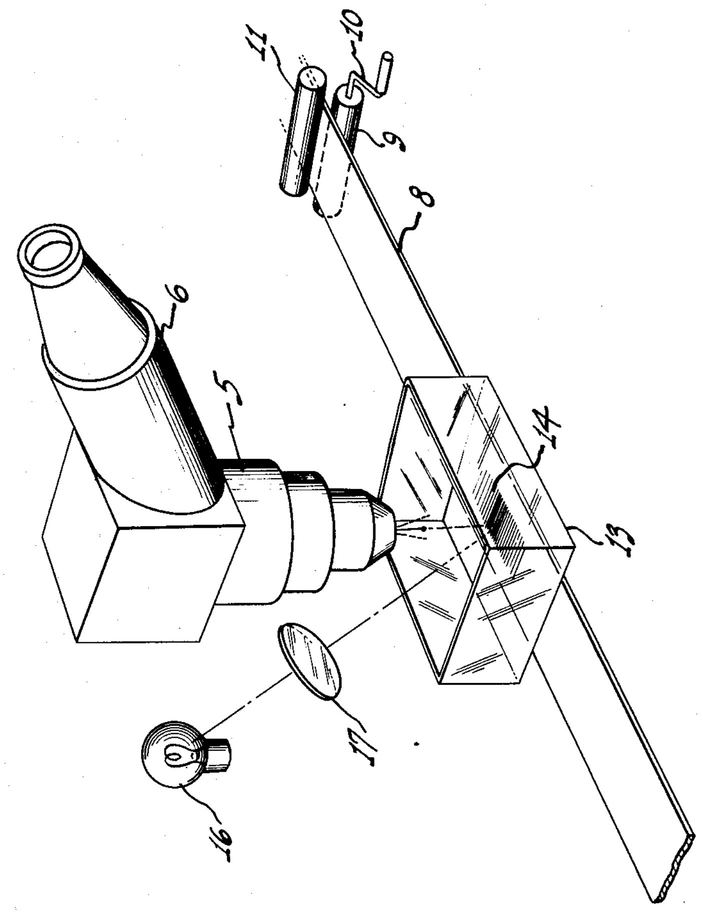
INVENTOR.
DOROTHY L. BLANEY
BY [signature]
ATTORNEY Patented Nov. 21, 1950 2,530,564

UNITED STATES PATENT OFFICE 2,530,564

EDITING AND INSPECTION OF INVISIBLE SOUND TRACKS

Dorothy L. Blaney, Los Angeles, Calif., assignor to Radio Corporation of America, a corporation of Delaware Application June 30, 1948, Serial No. 36,047

2 Claims. (Cl. 179—100.2)

This invention relates to magnetic sound record production, and particularly to a method of and means for determining modulated and unmodulated points on an invisible sound record as well as the positioning and waveform of a magnetic record on its carrier, such as a tape or film.

With the advent of magnetic recording, whereby a steel wire, tape, or the magnetic particles coated on a film or tape are magnetized in accordance with the strength of a signal being recorded, it is particularly desirable and necessary to be able to readily locate certain points on the invisible sound record. It is well-known that a photographic sound record is visible, and portions of the record to be deleted or modified in some manner may be determined visibly either directly or under a microscope. This facilitates editing and synchronizing of the visible record with other records or a concomitant picture.

A magnetic record, however, is not visible to the eye, and consequently, the exact positions of synchronizing marks placed thereon by sound or points at which the sound record is to be cut are not easily determined even after reproduction of the record, which provides only the general location of the places being sought. The present invention, therefore, is directed to a simple and efficient method of and system for making visible these invisible synchronizing and other sound points.

The principal object of the invention, therefore, is to facilitate the editing or location of certain modulations on an invisible sound record.

Another object of the invention is to provide an improved method of and system for making visible an invisible sound record.

A further object of the invention is to provide an improved system of locating points of sound modulations or points of no modulations on a record medium having an invisible sound record thereon.

A still further object is to provide a simple and rapid method of and means for determining track alignment and azimuth orientation of an invisible sound record.

Although the novel features which are believed to be characteristic of this invention will be pointed out with particularity in the appended claims, the manner of its organization and the mode of its operation will be better understood by referring to the following description, read in conjunction with the accompanying drawing, forming a part hereof, in which the single figure is a diagrammatic, perspective view of a system embodying the invention.

Referring now to the drawing, a microscope 5 having an eye-piece 6 is shown directed at a magnetic tape or film 8 on which a magnetic record has been recorded. Placed directly on top of the tape 8, and under which the tape may be positioned and periodically moved by a capstan 9 having a hand crank 10 and a pressure roller 11, is a box 13, which may or may not have a transparent top, and which has a bottom of very thin glass or paper. Within the box 13 are very small powdered particles of iron filings 14. These particles may be of the iron oxide type used for the tape itself and of a size small as compared with the shortest wave length to be indicated. As the tape is moved under the box, or the box moved over the tape, the iron particles will align themselves in accordance with the position and degree of magnetism in the tape, as shown at 14. By illuminating the iron particles by light from a lamp 16 projected by a lens 17 in conjunction with the microscope, track alignment and azimuth orientation are readily discernible. The actual location of the modulations on the tape may be observed without a microscope, although its use is desirable for determining the actual length of the modulations and their amplitude.

By making the box of sufficient length, several cycles of various waveforms are visible, a one-thousand cycle frequency being easily determined. Iron particles produced by filing a piece of soft iron, such as "Puron," have been found to provide good results. Although a box has been shown to contain the iron particles, it is to be understood that they may be sprinkled directly on the tape, preferably on the reverse side thereof.

I claim:

1. A system for making visible the position and waveform of a recorded magnetic sound record on a flat magnetic record medium, comprising a container, a record medium, a plurality of magnetic particles of a size small as compared with the shortest wave-length of the sound waves on said record and loosely positioned in said container, means for observing the particles in said container, and means for varying the position of said record medium with respect to said particles.

2. A system for making visible the waveform and position of certain magnetic variations in a flat magnetic record medium on which an invisible magnetic sound record has been recorded, comprising a container, a plurality of magnetic particles of a size small as compared with the shortest length of the sound variations recorded on said record and loosely positioned in said container, and means for moving said particles with respect to and adjacent said record medium to render visible the form and position of said magnetic variations in said medium.

DOROTHY L. BLANEY.

REFERENCES CITED

The following references are of record in the file of this patent:

UNITED STATES PATENTS

| Number | Name | Date |
|---|---|---|
| 2,252,475 | Unger | Aug. 12, 1941 |

FOREIGN PATENTS

| Number | Country | Date |
|---|---|---|
| 439,324 | Great Britain | Dec. 4, 1935 |
| 118,407 | Germany | Nov. 8, 1899 |